United States Patent [19]
Javitt

[11] Patent Number: 6,137,990
[45] Date of Patent: Oct. 24, 2000

[54] APPARATUS FOR IMPROVING THE SIGNAL TO NOISE RATIO IN WIRELESS COMMUNICATION SYSTEMS THROUGH MESSAGE POOLING AND METHOD OF USING THE SAME

[75] Inventor: Joel I. Javitt, Hillside, N.J.

[73] Assignee: NCR Corporation, Dayton, Ohio

[21] Appl. No.: 08/923,809

[22] Filed: Sep. 4, 1997

Related U.S. Application Data

[62] Division of application No. 08/348,526, Dec. 2, 1994, Pat. No. 5,722,048.

[51] Int. Cl.[7] .................................................. H04B 1/10
[52] U.S. Cl. ........................ 455/63; 455/67.1; 455/566; 371/35; 371/57
[58] Field of Search ..................... 455/63, 67.1, 67.3, 455/229, 517, 561, 567, 566, 501, 41, 42; 371/33, 57

[56] References Cited

U.S. PATENT DOCUMENTS

| | | |
|---|---|---|
| 4,075,632 | 2/1978 | Baldwin et al. . |
| 4,654,880 | 3/1987 | Sontag ....................................... 455/41 |
| 4,669,109 | 5/1987 | Le Cheviller et al. .................. 379/143 |
| 4,739,328 | 4/1988 | Koelle et al. . |
| 4,786,907 | 11/1988 | Koelle . |
| 4,888,767 | 12/1989 | Furuya et al. . |
| 4,905,234 | 2/1990 | Childress et al. . |
| 5,430,760 | 7/1995 | Dent ......................................... 375/200 |
| 5,450,612 | 9/1995 | Chanroo et al. ........................ 455/38.1 |
| 5,465,405 | 11/1995 | Baseghi et al. . |
| 5,504,475 | 4/1996 | Houdou et al. . |
| 5,722,048 | 2/1998 | Javitt ........................................ 455/63 |

FOREIGN PATENT DOCUMENTS

| | | |
|---|---|---|
| 9206454 | 4/1992 | WIPO . |
| 9411832 | 5/1994 | WIPO . |

*Primary Examiner*—Daniel S. Hunter
*Assistant Examiner*—Darnell R. Armstrong
*Attorney, Agent, or Firm*—Craig E. Miller

[57] ABSTRACT

Apparatus for improving the signal to noise ratio in wireless communication systems through message pooling including hardware, software and protocol contained within a packet data communication system which enables a wireless communication system, for example an electronic display system, to adapt communication techniques to meet customer based accuracy requirements independent of changes in the signal to noise ratio of the communication channel and methods of using the same. Communication having low signal to noise ratios are improved using intelligent retransmissions of the communication signals and statistical detection or demodulation. Such techniques are particularly useful when used in wireless communication in unbalanced systems, such as electronic display systems.

2 Claims, 4 Drawing Sheets

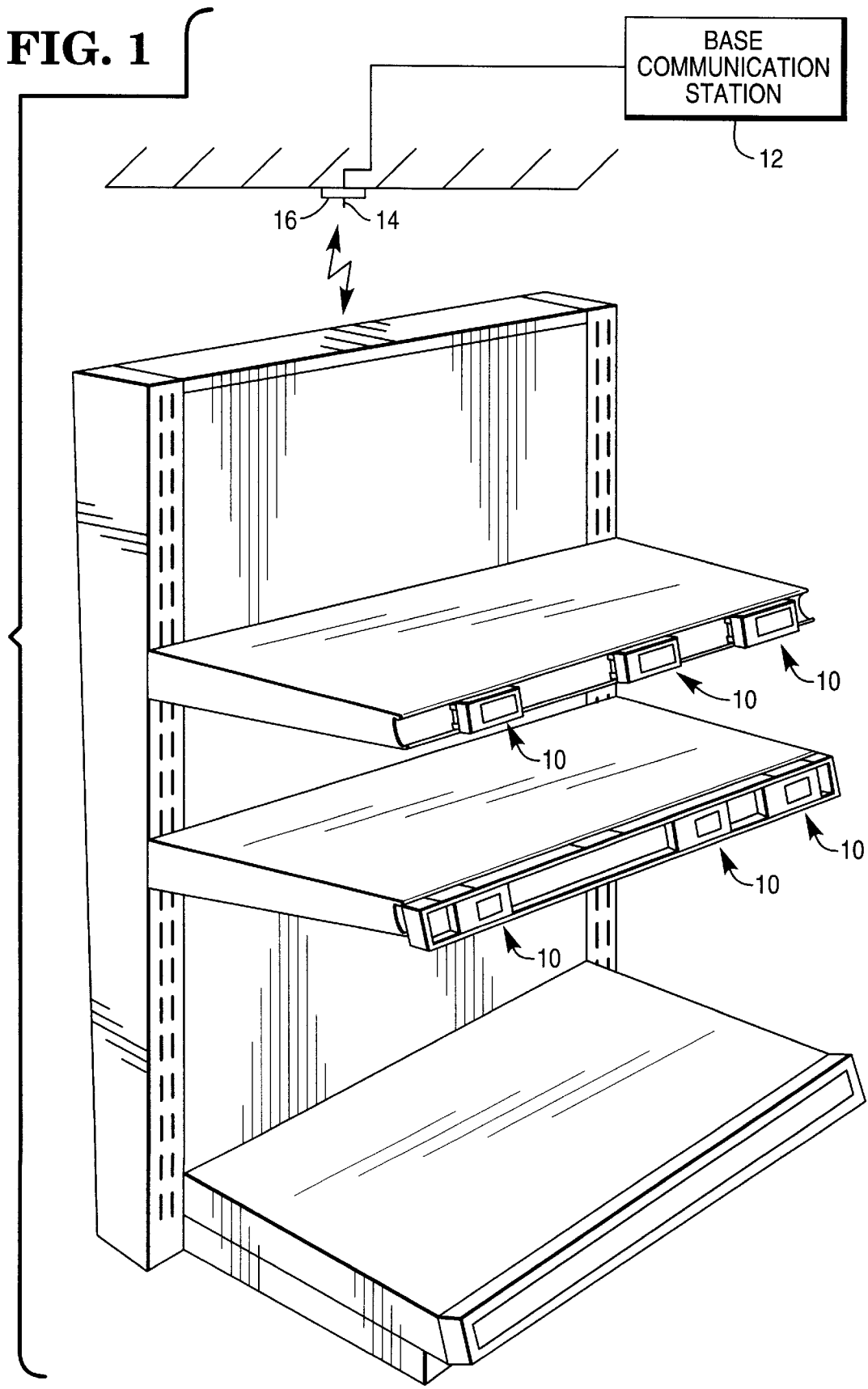

FIG. 2A Pooled Downlink Protocol Message Transmission and Acknowledgment Chart

Time advances from top to bottom and left to right

Notation Used:
Mxx Message named xx is transmitted to a particular tag but not received
Rxx Message named xx is transmitted and received by a particular tag
Dxx Message named xx is sent and its receipt does not matter
Uxx Tag is acknowledging message xx
S# Superframe broadcast TOD=#

NOTE: Different messages are being received and acknowledged by different tags

NOTE: only time slots 1, 4, & 10 are shown for brevity uplinks last 3 slots

| TOD | 2 | 2 | 2 | 3 | 3 | 3 | 4 | 4 | 4 | 5 | 5 | 5 | 6 | 6 | 6 | 7 | 7 | 7 | 8 | 8 | 8 | 9 | 9 |
|---|---|---|---|---|---|---|---|---|---|---|---|---|---|---|---|---|---|---|---|---|---|---|---|
| Time Slot | 1 | 4 | 7 | 10 | 1 | 4 | 7 | 10 | 1 | 4 | 7 | 10 | 1 | 4 | 7 | 10 | 1 | 4 | 7 | 10 | 1 | 4 | 7 | 10 | 1 | 4 |
| BATCH SIZE 4 FRAME 0 | | | | | | | | | | | | | | | | | | | | | | | | |
| 1 | S2 | S2 | | S3 | U2F | S3 | U3F | S4 | U3F | S4 | UCF | S5 | | S5 | | S6 | U5F | S6 | | S7 | | S7 | | S8 | | S8 | | S9 | |
| 4 | R21 | RB1 | | R31 | | RC1 | | M41 | | RD1 | | R51 | | RE1 | | R61 | | RF1 | | R71 | | | | R81 | | | | R91 | |
| 4 | M22 U21 | RB2 UB1 | M22 U31 | DB2 UC1 | R22 | | DB2 UD1 | M52 U51 | | UE1 M52 U61 | | UF1 R52 U71 | | | | D52 U81 | | U91 | |
| 1 | R23 | | R33 | | R43 U22 | | UB2 R53 U22 | | UB2 R63 U22 | | UB2 R73 U22 | | UB2 | | U52 | | U52 | |
| 4 | U23 | | U33 | | U43 | | U53 | | U63 | | U73 | | | | | |
| 1 | | | | | | | | | | | | | | | | |
| 4 | | | | | | | | | | | | | | | | |
| 1 | | | | | | | | | | | | | | | | |
| 4 | | | | | | | | | | | | | | | | |
| 1 | | | | | | | | | | | | | | | | |
| 4 | | | | | | | | | | | | | | | | |
| 1 | | | | | | | | | | | | | | | | |
| 4 | | | | | | | | | | | | | | | | |
| 1 | | | | | | | | | | | | | | | | |
| 4 | | | | | | | | | | | | | | | | |
| 1 | R2F | RBF | | R3F | | RCF | | M4F | | R5F | | | | | | | | | | | | | | |
| ... | MOD (TOD, BATCH NUM)=0 then if acknowledgment waiting acknowledge else continue current status |

FIG. 2B

| 9 | 9 | 10 | 10 | 10 | 10 | 11 | 11 | 11 | 11 | 12 | 12 | 12 | 12 | 13 | 13 | 13 | 13 | 14 | 14 | 14 | 14 | 15 | 15 | 15 | 15 | 16 | 16 | 16 | 16 |
|---|---|---|---|---|---|---|---|---|---|---|---|---|---|---|---|---|---|---|---|---|---|---|---|---|---|---|---|---|---|
| 7 | 10 | 1 | 4 | 7 | 10 | 1 | 4 | 7 | 10 | 1 | 4 | 7 | 10 | 1 | 4 | 7 | 10 | 1 | 4 | 7 | 10 | 1 | 4 | 7 | 10 | 1 | 4 | 7 | 10 |
| S9 | | S10 | | S10 | | S11 | | S11 | | S12 | | S12 | | S13 | | S13 | | S14 | | S14 | | S15 | | S15 | | S16 | | S16 | |
| | | | U52 | | | | U52 | | | | | | | | | | | | | | | | | | | | | | |

FIG. 2C

APPARATUS FOR IMPROVING THE SIGNAL TO NOISE RATIO IN WIRELESS COMMUNICATION SYSTEMS THROUGH MESSAGE POOLING AND METHOD OF USING THE SAME

This is a Division of application Ser. No. 08/348,526, filed Dec. 2, 1994, now U.S. Pat. No. 5,722,048.

BACKGROUND AND SUMMARY OF THE INVENTION

The present invention relates generally to new and novel improvements in apparatus for improving the signal to noise ratio in wireless communication systems through message pooling and methods of using the same. More particularly, the present invention relates to apparatus for improving the signal to noise ratio of wireless communication systems through message pooling and methods of using the same, particularly in conjunction with electronic display systems.

Large retail stores often deal with several tens of thousands of different kinds of goods. In such stores, much attention is paid to the management and control of the inventory of goods and the displaying and labeling of the prices of the goods being sold. Accordingly, much effort is expended and careful attention is paid to managing and controlling the stock of goods and to labeling prices of products displayed on shelves or in showcases. Mistakes as to the labeling of the prices of goods could cause dissatisfaction to customers and damage the reputation of the store.

Therefore, it is desirable to correctly identify the prices of goods and minimize the number of pricing errors. Accordingly, electronic display systems having multiple electronic display modules have been developed. Such electronic display systems are typically arranged such that light weight compact electronic display modules which display the product's price, along with other product information, are place on display shelves or showcases in front of the displayed products. These types of electronic display systems typically allow the prices of products displayed in the electronic display portions of the electronic display modules to be changed when the prices are raised or lowered and/or when the arrangement of goods displayed on the display shelves or showcases are changed.

In such electronic display systems, it becomes possible to reliably identify the correct prices of goods since changes in the prices of goods displayed on the electronic display portions of the electronic display modules are controlled and managed by a communications base system or some other processing control unit. If desired, other product information, for example, inventory or stocking information, product identification numbers or codes, and product volume or weight, could be displayed on the electronic display portions of the electronic display modules. In addition, electronic display systems in accordance with the present invention could be used in applications other than retail store environments, for example, in identifying inventory information in warehouses or distribution centers.

It is desirable to maintain wireless communication in electronic display systems over wide ranges of path loss and noise levels. This is typically accomplished by designing wireless communication systems for the worst case operating scenario, often resulting in additional cost.

Accordingly, an object of the present invention is to provide an apparatus for improving the signal to noise ratio in wireless communication systems using message pooling.

Another object of the present invention is the provision of an apparatus for improving the signal to noise ratio in wireless communication using message pooling, particularly in conjunction with wireless communication systems having unbalanced links, such as electronic display systems.

These and other objects of the present invention are attained by the provision of hardware, software and protocol contained within a pocket data communication system which enables a wireless communication system, for example an electronic display system, to adapt communication techniques to meet customer based accuracy requirements independent of changes in the signal to noise ratio of the communication channel. Communication having low signal to noise ratios are improved using intelligent retransmissions of the communication signals and statistical detection or demodulation. Such techniques are particularly useful in wireless communication in electronic display systems.

Other objects, advantages and novel features of the present invention will become apparent in the following detailed description of the invention when considered in conjunction with the accompanying drawings.

BRIEF DESCRIPTION OF THE DRAWINGS

FIG. 1 is a perspective view of a typical electronic display system, including a ceiling mounted transmitting/receiving antenna and a typical display showcase having multiple displays, in accordance with a preferred embodiment of the present invention.

FIG. 2A is a top portion of a table showing an example of downlink message communication and the electronic display system algorithm for implementing message pooling in accordance with a preferred embodiment of the present invention.

FIG. 2B is a middle portion of a table showing an example of downlink message communication and the electronic display system algorithm for implementing message pooling in accordance with a preferred embodiment of the present invention.

FIG. 2C is a bottom portion of a table showing an example of downlink message communication and the electronic display system algorithm for implementing message pooling in accordance with a preferred embodiment of the present invention.

DETAILED DESCRIPTION OF THE DRAWINGS

Electronic display systems have achieved cost effective operation by using modulated back scatter techniques and by not including a radio frequency source in the electronic display units. Because these electronic display units acknowledge messages through the passive technique of modulated back scatter, the available signal to noise ratio near the desired limits of range is limited. The system performance can be improved by repeating identical transmissions to electronic display units near the range limits and recording the strength of the acknowledgment for each transmission. Then, by using statistical techniques, the electronic display system can determine if the message has been received. The electronic display unit's capability to compensate for transmissions that fail because of multipath fading and bit errors is based on a system protocol. This protocol recognizes that a received message is a member of a group of repeated identical transmissions and acknowledges all messages even if only one is received. To compensate for long term shadowing of electronic display units, if an electronic display unit does not acknowledge, the system will repeat the transmission several hours later.

The electronic display system of the preferred embodiment uses modulated back scatter to enable passive receivers to confirm receipt of messages. The confirmation is performed by having the receiver modulate the signal reflected by the antenna at a particular frequency. Each transmitted message is addressed to a particular electronic display unit 10 and has a time interval reserved for electronic display unit 10 to generate an acknowledgment. Base communication station 12, consisting of transmitter 14 and homodyne receiver 16, then measures the energy level present in the appropriate frequency and time period. This measurement is called the signal level. Typically, with electronic display units 10 generating a signal in a multipath transmission environment the signal level has significant random variations from one measurement reading to the next. The receiver also measures the energy present at other frequencies and time periods. This measurement is called the noise level. The noise level may also have a significant random variation from one measurement to another. Base communication station 12 then decides if the signal level is sufficiently high to conclude with the desired confidence level that is could not be caused by noise and therefore must have been caused by electronic display unit 10 acknowledging the message.

This problem, when described as above for base communication station 12, can be reduced to and solved as a statistical inference problem by a process of hypothesis testing. The hypothesis test has the following components, the null hypothesis is that the signal level does not significantly differ from the population of noise levels, for example is less than 2 dB greater than the noise level. The alternative hypothesis is that the signal level is greater than the noise level with a specified level of confidence. A hypothesis test is then constructed by determining a threshold that the signal level must exceed to reject the null hypothesis. Because the noise level has significant random variation, rejecting the null hypothesis with a high degree of confidence will require that the signal level be large. If multiple independent measurements of the signal level are made and the statistical parameters of the sample are compared with the expected results from an equal size population of noise, the expected variation in a population of noise will be lower than for an individual sample. The law of large numbers states that as the size of a sample increases the variability will decrease. Since the variability has decreased, the signal level necessary to reject the null hypothesis has decreased as well. This implies that if base communication station 12 sends multiple identical messages to electronic display unit 10 and receives multiple acknowledgments, the signal level of each acknowledgment can be combined into one statistic. The threshold for concluding that the message was received is now reduced as the sample size increases. By using this technique base communication station 12 can detect acknowledgments from otherwise undetectable distant electronic display units 10.

A precise definition for the following terms will assist in an efficient discussion of message pooling:

Pooling Uplinks—Grouping the acknowledgments together as described above to reduce the required threshold.

Pooling Downlinks—Grouping received downlink messages in electronic display unit 10 such that if one message in a group of N is received, N acknowledgments are transmitted. The timing of the N acknowledgments is independent of which message is actually received.

Communication Attempt—A group of identical messages which are sent to electronic display unit 10 and their associated uplinks which are evaluated to determine if electronic display unit 10 has received at least one of the messages.

Downlink Batch Size—The number of downlinks pooled by electronic display unit 10.

Small Batch—The smaller of the two downlink batch sizes in a particular system at a particular time.

Large Batch—The larger of the two downlink batch sizes in a particular system at a particular.

Uplink Batch Size—The number of uplinks pooled for a given communication attempt. This may contain one or more downlink batches.

Downlink Success Rate (DSR)—A particular electronic display unit's fraction of downlink messages that it receives, assuming that it is not blocked by some unusual circumstance, for example, being blocked by a pallet of cans in the aisle.

Batch Success Rate (BSR)—The fraction of Downlink Batches for a particular electronic display unit that has one successful message delivered and therefore generates acknowledgments. This also varies based on the downlink batch size.

Message Success Rate (MSR)—The fraction of messages for a particular electronic display unit that is received by the electronic display unit and has a sufficiently strong acknowledgment for the base communications station to conclude that the message was received. This varies based on downlink and uplink batch sizes.

Signal Level—A numerical value computed by a digital signal processor as a measurement of the energy detected in a narrow band corresponding to the frequency at which a particular electronic display unit is expected to generate an acknowledgment signal.

Noise Level—A numerical value computed by a digital signal processor as a measurement of the energy detected in a narrow band that is similar to the band containing the acknowledgment but at a different frequency and therefore not materially effected by any electronic display unit's acknowledgment.

Signal Noise—The signal level for frames in which no acknowledgments were expected.

Broad Band Noise Level—A numerical value computed by a digital signal processor that represent the variance of the time domain digital signal after filtering out 60 Hz. or 50 Hz. harmonics. This value provides a reliable instantaneous measurement of the interference level for a particular frequency hop.

The discussion of the message pooling protocol and algorithms is broken down into three parts: the first part presents the protocol used to pool downlink messages; the second part presents the statistical procedures and algorithms used to implement the necessary hypothesis tests or to estimate the appropriate pool size for communicating with a particular electronic display unit; and the third part then overviews the communications process with pooling and the data storage capabilities to support it.

Downlink pooling allows the electronic display system to compensate for messages that are not correctly received by more distant electronic display units 10. The electronic display system does not include an error correction in electronic display units 10, thus if a single bit in the 127 bit downlink packet is in error, the tag will detect the error using an error detection code and ignore the message. To compensate for the loss of messages, the electronic display system retransmits messages that were not acknowledged.

For electronic display units 10 in a location that with a poor radio frequency link, sometimes referred to as distant electronic display units, detecting an individual acknowledgment unambiguously is difficult. In these cases it is desirable to send multiple downlinks and receive multiple uplinks in order to ensure effective communication. If multiple transmissions are sent to electronic display unit 10, lost transmissions can be compensated for by downlink pooling.

When downlinks are pooled, electronic display unit 10 that receives a single message will know that the message is a member of a group or batch of N identical messages and responds to all N messages even though it may have correctly received only one of the transmitted messages. If electronic display unit 10 knows by receiving one message when the acknowledgment for all messages in the batch should occur, it can acknowledge as if it had received all of the messages on the basis on having received just one. Since the messages are identical, it is irrelevant if the tag received more than one of the messages, therefore, electronic display unit 10 acknowledging unreceived messages is useful. One way to implement downlink pooling would be to have each message carry information that would tell electronic display unit 10 the batch size and when to start acknowledging. Another way includes a protocol which allows electronic display unit 10 to determine easily when to acknowledge without adding additional information to each message.

The protocol takes advantage of preexisting synchronized timing information known to both the base communication unit 12 and to all electronic display units 10. This information includes a frame number which determines which frame within a group of 16 super frames is currently being used and a time of day (TOD) code which counts the number of super frames (modulo $2^{16}$) that have occurred since the electronic display system was last initialized. This information is transmitted to the particular electronic display unit 10 through a system identification burst. The time of day (TOD) code is transmitted in the system identification burst and the system identification burst itself is preferably transmitted in frame 0. Therefore, receiving the system identification burst conveys the frame number. Since all electronic display units 10 must correctly receive at least one system identification burst before achieving synchronization and being enabled for communication, all electronic display units 10 and base communication station 12 will have the same value for the frame number and the time of day (TOD) code.

The protocol uses the following parameters:

Batch sizes will be powers of 2 (i.e., 1, 2, 4, 8 or 16).

All the messages in a batch will be sent in the same frame and time slot of successive super frames (i.e., successive time of day (TOD) code values).

The first downlink in a batch will be sent when the time of day (TOD) code modulo batch size is 1. Therefore, the last will be sent when time of day (TOD) code modulo batch size is 0.

The first acknowledgment will be enabled immediately after the last downlink interval for the batch and will occur in the associated uplink time slot of the next frame.

Frames will have a batch size associated with them which is rarely changed. The odd frames will have one size (small batch) and the even frames will have another (large batch).

The size of the small batch and the large batch will be communicated to all of the tags in the system identification burst.

In a preferred embodiment of the present invention, at any one time a particular electronic display unit 10 will be in the process of receiving or acknowledging only one message. Therefore base communication station 12 will send one batch of messages to electronic display units 10 and wait for all acknowledgments before sending additional messages. For example, if base communication station 12 sends a batch of eight (8) messages to a particular electronic display unit 10 in frame 2 beginning at time of Day (TOD) code 1, the next batch of messages to that particular electronic display unit 10 may not begin until time of day (TOD) code 17. Messages may not be sent to the same electronic display unit 10 in other frames either. Broadcast messages that are addressed to all electronic display units 10 and which expect no acknowledgment may be transmitted at this time. Once electronic display unit 10 receives a single downlink message, it will transmit all acknowledgments.

Since the protocol supports only two different size batches, which are seldom changed, these two sizes must be determined so that they provide reasonable efficient communication to the population of electronic display units 10. The electronic display system supports two different downlink batch sizes simultaneously, these are referred to as small batch and large batch. The uplink batch sizes will generally be an integer multiple of the downlink batch size that base communication station 12 selects for a particular electronic display unit 10. The electronic display system preferably uses one downlink batch size for odd frames and a different one for even frames and both sizes are broadcast to all electronic display units 10 in the system information burst. For simplicity, the small batch corresponds to the odd frames and the large batch corresponds to the even frames. It is also preferably an assumption that the size of the large batch and the small batch will not be changed very often.

If all electronic display units 10 in a given electronic display system do not have the same batch sizes, erratic performance, including false positive acknowledgments may result. Because the electronic display system is somewhat complicated, it will take up to six minutes to assure that all electronic display units 10 have the same batch sizes. Choosing the optimal size for the downlink batches will involve many tradeoffs and assumptions. However, the following heuristics have been found to produce acceptable results. Selecting a batch size involves a trade-off between having a large batch so that even the weakest tag would have a 99.9% batch success rate (BSR) and having the batch small enough so that most communications are not forced to use more messages than needed for other reasons.

The optimal value for the large batch size will most likely be determined by the downlink success rate (DSR) of the weakest electronic display units 10 so that even these electronic display units 10 have a batch success rate (BSR) of close to or exceeding 95%. Initially, the weakest electronic display units 10 will be identified based on experience. In initial determinations, a batch size of 8 was used.

The downlink success rate (DSR) is a metric of system performance and robustness. As the electronic display system is tested, the downlink success rate (DSR) of individual electronic display units 10 can be measured using the techniques discussed below and the initial estimate refined. The minimum batch sizes for various values of the downlink success rate (DSR) and batch success rate are shown in Table 1 below:

TABLE 1

| Downlink Batch Size | Minimum Downlink Success Rate (DSR) for Batch Success of: | | |
|---|---|---|---|
| | 98.0% | 95.0% | 90.0% |
| 2 | 85.9% | 77.6% | 68.4% |
| 4 | 62.4% | 52.7% | 43.8% |
| 8 | 38.7% | 31.2% | 25.0% |
| 16 | 21.7% | 17.1% | 13.4% |

Note that if the uplink batch sizes contain several downlink batches, the downlink success rate (BSR) is more critical, and the downlink batch size should then be increased. For downlink sizes greater than 1, it is likely that if one batch fails, the uplink batch also fails. Therefore, it is desirable for all downlink batches in an uplink batch to be successful. It is desirable for all batches in a communication attempt to be successful (excluding shadowing) given by the equation below to be greater than about 85% for 95% of all electronic display units 10:

$$1 - \frac{Uplink\_Batch\_Size}{Downlink\_Batch\_Size} \times (1 - BSR) \geq 85\%$$

The small batch size is preferably chosen based on the following bounds. Initially, its minimum value will be the greater of 1 or the uplink batch size for the least critical messages on the strongest quartile of electronic display units 10. For any particular value of the small batch size, some portion of electronic display units 10 will require use of the large batch because of a downlink success rate (DSR) that is unacceptably low if the small batch is used. As the size of the small batch decreases, this portion increases. If the portion of electronic display units 10 that require the large batch exceeds the large batch capacity, the small batch size should be increased until this condition is eliminated. In initial determinations, the small batch size was set at 1.

The batch size for the odd and even frames are conveyed to all electronic display units 10 in the system identification burst. Each batch size is coded in one nibble using the code shown below in Table 2:

TABLE 2

| | Binary | | | |
|---|---|---|---|---|
| Value | b3 | b2 | b1 | b0 |
| 1 | 0 | 0 | 0 | 0 |
| 2 | 0 | 0 | 0 | 1 |
| 4 | 0 | 0 | 1 | 1 |
| 8 | 0 | 1 | 1 | 1 |
| 16 | 1 | 1 | 1 | 1 |

The codes above are stored by electronic display unit 10 and can be used by electronic display unit 10 to perform the modulus operation with minimal processing. Electronic display unit 10 uses the above codes and bit-wise ANDs them with the least significant nibbles of the time of day (TOD) code. The result is the time of day (TOD) code modulo and the batch size value.

When base communication station 12 is turned on and starts transmitting, all electronic display units 10 obtain the correct batch size before they acquire synchronization. If the batch size is modified while base communication station 12 transmitting, care must be taken to avoid erratic operation and possible false positive acknowledgments during the transition period. It is difficult to analyze the complexity of the change-over process and how it will affect communication. The synchronization maintenance algorithm will cause electronic display unit 10 to lose synchronization if it does not receive 15 consecutive system information bursts, a process that takes less than six minutes. To change batch sizes, the following steps should be followed:

1. Wait unit any time-critical messages have been sent.
2. Complete both downlinks and uplinks for all batches of communication that were started.
3. Change the desired data in the system information burst.
4. Transmit dummy messages.
5. Wait for 15 super frames, about 6 minutes.
6. Restart communication.

If the electronic display system has been turned off for several minutes, the batch sizes may be changed before the electronic display system is turned on again and no special care is required.

The actual transmission of a downlink batch and the associated reception of acknowledgments will be implemented by a subroutine that will be called the downlink manager. The downlink batch routine will receive the following information:

1. Electronic display unit's 10 identification number.
2. The content of the message.
3. The number of messages in the downlink batch.
4. Desired receive antenna mode (scan, selective, omnidirectional).
5. If selective antenna mode is used, then the list of enabled antennas for each base communication station 12 is included.

The downlink manager will maintain a queue for each of the 15 communication frames within a super frame. Frame 0 is typically used for the system information burst. The queues will operate using a first in, first out (FIFO) discipline. The downlink manager will respond to queries about the length of both queues. When a request for a downlink batch is received, the downlink manager will perform the following actions to enter messages in the queue:

1. Check that the number of downlinks corresponds to either the small batch or the large batch. If not, it will return an error message that reports the batch sizes.
2. Attempt to assign the message the frame queues with the appropriate batch size having the shortest length. With two queues of equal length, the downlink manager should assign the message to the one to be transmitted sooner. The downlink manager will check that this assignment will not cause two batches of communications to the same electronic display unit 10 to overlap. Electronic display unit 10 cannot receive a message from one batch while it is receiving or acknowledging a message from a different batch. If an overlap would occur, the downlink manager must take appropriate remedial action.

For each downlink frame, the downlink manager will transmit messages to base communication station 12 as follows:

1. If the time of day (TOD) code modulo for the batch size appropriate to that frame does not equal one, it will retransmit the message transmitted in that frame the last super frame.
2. If the time of day (TOD) code modulo for the batch size appropriate to that frame is equal to one, the downlink manager will take the next message off the front of the queue for that frame and transmit it. It will also transmit appropriate antenna switch instructions to base communication station 12. If there are no messages on the queue, it will construct an appropriate dummy message and transmit that.

For every uplink time slot the downlink manager will record the acknowledgment data from base communication station 12. If the time of day (TOD) code modulo for the batch size is one, then the downlink manager will complete the pending request and return all the acknowledgment information to the calling program. If a dummy message was involved, the downlink manager will add the acknowledgment information to the noise data base.

Figure 2C:
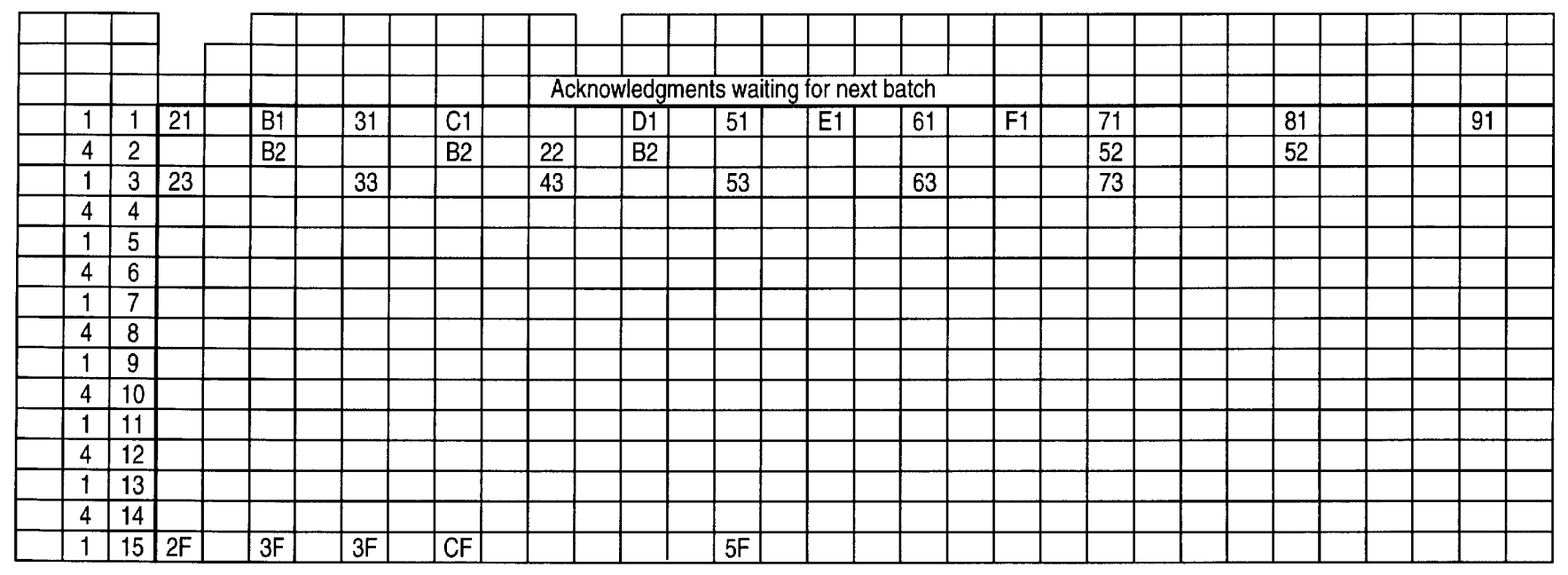

Referring to FIG. 2, an example of the downlink message communication and the electronic display system algorithm for implementing message pooling in accordance with a preferred embodiment of the present invention is shown.

In a preferred embodiment of the present invention, a subroutine supports automatic measurement of the downlink success ratio (DSR) associated with a particular electronic display unit 10 and location. This routine will be given an electronic display unit 10 identification number, a requested confidence interval, and an indication of how recently electronic display unit 10 was moved. The routine will initiate downlink measurements and/or utilize information from a history file and then return a measured downlink success ratio (DSR). This procedure compares the average acknowledgment level from large downlink batches with the average acknowledgment level from unpooled downlinks with a batch size equal to 1. The downlink success ratio (DSR) for a particular electronic display unit 10 at a particular location can be estimated using the following formula:

Experimental determination of downlink success ratio (DSR) using pooling, where:

$x_{sm}$—Sample average acknowledgment level without downlink pooling $\mu_s$—Theoretical average acknowledgment level from a given electronic display unit 10

$\mu_n$—Theoretical average noise level $$x_{sm} = DSR \cdot \mu_s + (1-DSR) \cdot \mu_n$$

has solution for downlink success ratio (DSR)

$$DSR = \frac{(x_{sm} - \mu_n)}{(\mu_s - \mu_n)} - \text{Estimate of downlink success ratio } (DSR)$$

for example, when:

$\mu_n = 28$; $\mu_s = 32$; $x_{sm} = 30$ $$DSR = \frac{(x_{sm} - \mu_n)}{(\mu_s - \mu_n)} - \text{Downlink Success Ratio } (DSR) = 0.5$$

For electronic display units 10 with an uplink signal sufficiently above the noise level, the downlink success ratio (DSR) can be estimated by the simpler method of counting all uplinks above the midpoint between the average signal level and the average noise level as successes and those below as failures.

The downlink success ratio (DSR) of weaker electronic display units 10 is a metic of electronic display system performance and robustness. This technique can be used to allow automated measurement of the downlink success ratio (DSR) for field trials and customer installations. This test will demonstrate the margin in the electronic display system which will protect against extreme cases.

The goal of uplink pooling is to allow base communication station 12 to detect the acknowledgment of weak electronic display units 10 with a high degree of confidence. The value of uplink pooling can be understood intuitively as follows. A weak electronic display unit 10 will cause base communication station 12 to detect a higher energy level at the acknowledgment frequency than it otherwise would. However, since the noise level varies, this level may only exceed the distribution of noise levels 90% of the time. If multiple uplinks are grouped together and 90% levels are achieved 5 out of 5 tries, the possibility of this being due to noise is only 1 in 10,000. In considering the possibility of extremely weak electronic display units 10, even if the signal to noise ration for a weak electronic display unit 10 is 0 dB, the sum of the signal plus noise will average 3 dB above the noise level. The following processes can be performed to implement uplink pooling:

1. Information about the distribution of signal noise levels should be collected and analyzed.
2. Hypothesis tests should be constructed and thresholds determined.
3. A choice of the appropriate downlink batch size is made.
4. Messages are sent and a hypothesis test is conducted to obtain an acknowledgment.

The electronic display system collects and analyzes information about the level and distribution of signal noise. A fundamental assumption behind detection of an uplink signal in the electronic display system is that base communication station 12 can measure a signal level which is the energy present at a frequency band in which an uplink may have occurred and can determine with sufficient confidence that such a level could not have been due to noise. To facilitate this determination, base communication system should have sufficient information to be able to determine for any particular measurement that the likelihood that a particular signal level occurs based on noise alone. To determine this likelihood, the electronic display system collects three different data inputs as discussed in further detail below.

The signal noise level is a measurement of the signal level at a time when it is certain that an uplink signal is not present, such as after sending dummy messages. One advantage of this measurement is that it is, by definition, identical in terms of the frequency measured and the measurement techniques to the actual signal level. However, one disadvantage is that the measurement cannot be made at the same time as a real uplink. Because noise levels may change rapidly with time based on both base communication station 12, as well as any potentially interfering transmitters frequency hopping, the past signal noise levels cannot be relied on to provide sufficient information to predict possible signal levels due to noise for a particular uplink signal. The potential time variation problem is compounded by statistical variations in the signal noise level, which leads to the need for multiple samples in order to predict the probability distribution. However, measuring the signal noise level has been found to be a good way to calibrate and/or check and verify the validity of other estimates of noise and to predict the distribution of signal levels due to noise given other information about the noise level.

The noise level is a measurement of energy at a different frequency with the same band width and similar frequency processing as the signal noise level. This measurement should not be affected by the presence of an uplink at the uplink frequency. This measurement has the advantage of providing a noise estimate about the particular uplink frame being considered and of providing a number of samples in a relatively short period of time while uplink activity is occurring. However, because it is narrow band, it will have significant random variations similar to the signal noise level and independent of the actual noise level. Experimental results without frequency hopping in a non-interference environment show that the statistical parameters and distribution of the noise level track the signal noise level well. A sample of at least 100 noise level measurements is preferably used to compute the likelihood of particular signal levels occurring due to noise. If necessary, populations of noise levels will be gathered for each hop frequency. Performance may be further enhanced by using a broad band noise level.

The broad band noise level will measure the noise over a broad bandwidth. One advantage of a broad band noise measurement is that is has less statistical variation from sample to sample. Therefore, based on one sample, base communication station 12 will have an accurate estimate of the average noise measurement. Prior to computing a broad-band noise estimate, the effects of any 1/F noise and 60 Hz harmonics which will not affect the narrow band noise should be filtered out. The signal noise level distribution will be predicted from the broad band noise based on fitting experimental data and/or theoretical models. Theory predicts that the noise level in band-limited Gaussian noise will be $\chi^2$ distributed with degrees of freedom of 2×Bandwidth× Time.

The statistical techniques used in uplink pooling depend on verifying the independence assumption. Software in the system will experimentally verify that each sample of signal noise relative to the broad band noise level or the average of the noise level is an independent random variable. It should not be auto-correlated in time or correlated with hop frequency. If necessary, remedial actions may be taken to either eliminate sources of correlation or identify separate populations and use statistics appropriate for those particular populations.

These statistical techniques are potentially sensitive to impulsive noise phenomenon, which often occur in engineering applications. Even though the signal noise levels may apparently closely follow a particular distribution, it is difficult to draw conclusions about values on the tail of a distribution. All signal noise level and noise level samples that are above the 98th percentile based on the probability distribution used in the analysis should be recorded with their time of occurrence and associated broad band noise measurement. These samples are called outliers. It will be most convenient if the list of outliers is sorted by noise level value and the total number of valid samples from which the list was drawn is maintained. If the broad band noise measurement is subject to significant variation, the percentiles and records will be different for each group of broad band noise measurements. It is possible that the broad band noise level may fall into two distinct categories of normal and high. Normal levels would show only statistical variations and possible time dependent shifts over the course of several hours or days. High levels would result from interference and may be high enough as to exclude uplink communication during particular time periods. In this case, the best approach has been found to discard all samples with high noise levels and not use them for uplink purposes.

Hypothesis testing involves testing a sample against information about the population distribution from which it is drawn and determining the likelihood that a given hypothesis is true. The best known statistical techniques involve determining a null hypothesis and alternative hypothesis, planning an experiment to use a given sample size choosing a statistic, for example the average, and a threshold for that statistic, gathering the data, computing the statistic and rejecting or not rejecting the null hypothesis. Because these techniques are well-known and analytically traceable, they are useful for projecting worst case performance.

Given the nature of the electronic display system in accordance with the present invention, it is more efficient and algorithmically simpler from a decision making point of view to use techniques of sequential analysis. In sequential analysis, the experiment is repeated until either one of two hypotheses has been concluded. While precise values for constructing sequential hypothesis tests are analytically difficult to calculate, good results can be obtained by calculating and using worst care bounds. In a sequential analysis, the ratio between the relative likelihood of each independent sample based on both hypotheses is determined. For the electronic display system in accordance with the present invention, each sample would be analyzed as shown below:

$$pr_i = \frac{p(\text{signal} \geq \text{min\_uplink\_signal})}{p(\text{signal\_is\_based\_on\_noise})}$$

The running product of all $pr_i$ from a batch is compared until it is greater than a high threshold and therefore demonstrates a valid uplink or it is less than a low threshold and therefore demonstrates that there is no uplink or that the uplink is below a minimum level.

The probability that the signal exceeds the minimum signal level will be computed assuming that signal levels are normally distributed in dB around the minimum level with a standard deviation determined by pooling individual electronic display units 10. Based on initial determinations, this standard deviation should be on the order of 4 to 6 dB.

The probability that the sample is based on noise may be estimated one of two ways. The most direct, but difficult, way is to have a large number of samples of signal noise levels or noise levels all of which were taken under conditions equivalent to the current samples. The probability the signal is based on noise is:

$$p(\text{signal\_is\_based\_on\_noise}) = \frac{\text{number\_of\_noise\_samples} \geq \text{sample}}{\text{total\_number\_of\_noise\_samples}}$$

With approximately 2000 noise samples, the above equation will begin to have significant statistical uncertainties above the 98th percentile. To take the worst case of these uncertainties these values are calculated as:

Let N=number of noise samples$\geq$sample for N$\leq$5

$$p(\text{signal\_based\_on\_noise}) = \frac{N + 2.6 \cdot \sqrt{N}}{\text{total\_number\_of\_noise\_samples}}$$

for N<5

$$p(\text{signal\_based\_on\_noise}) = \frac{N + 5.8}{\text{total\_number\_of\_noise\_samples}}$$

An alternative method is to fit a probability distribution function to the noise data. The choice of function should be supported by both theoretical and experimental data over a variety of conditions. For the electronic display system in accordance with the present invention, a normal distribution in dB is used as an approximation to what may be a Rayliegh distribution. For the final electronic display system, when the data is separated, the distribution may be $\chi^2$ with approximately 3.25 degrees of freedom. This can be verified experimentally. Because implosive noise may occur which is not covered by the physical properties underlining the majority of points in the distribution, the probability of samples above the 98th percentile should be computed based on actual data points and the equations above. If, after many electronic display systems have been tested in the field and significant statistical data is available, it is determined that the probability distribution and the experimental data always track well up to a particular percentile, this percentile can be used instead.

Computationally, the most convenient approach is to evaluate for each sample the log of the probability ratio as shown below:

$$LPR_i = \log\left(\frac{p(\text{signal} \geq \text{min\_uplink\_signal})}{p(\text{signal\_is\_based\_on\_noise})}\right)$$

For each message, the cumulative sum of $LPR_i$ is computed after every sample. This sum is then compared against a threshold and one of these four decisions are made:

1. An acknowledgment has been received and therefore the message has been delivered.
2. Electronic display unit 10 is not acknowledging due to shadowing or a broken electronic display unit 10. Transmission will be attempted several hours later.
3. There is insufficient data for a reliable conclusion and additional downlink batches are required.
4. Too many trial were performed, i.e., more than 80, and the operation should be terminated with an assumption of non-acknowledgment. This should be a rare occurrence.

As an example, the following equation calculates the log of the probability ratio for the electronic display system in accordance with the present invention for cases where the signal is below the 98th percentile noise level. In this example, x is a signal level value from the digital signal processor, $\mu_H$ is the minimum average signal level, $\mu_n$ is the average noise level, $\sigma_H$ is the estimated standard deviation of all tag acknowledgments, and $\sigma_n$ is the noise standard deviation. Cnorm is a function that returns the area between its argument and $-\infty$ under a standard normal curve. As stated above, alternative distributions may be more appropriate for other embodiments of the system in which case cnorm would be replaced by a more appropriate distribution function.

$$LPR(x) = \left[\frac{cnorm\left(\frac{x-\mu_H}{\sigma_H}\right)}{cnorm\left(\frac{\mu_n-x}{\sigma_n}\right)}\right] \text{ Log probability ratio function}$$

Three parameters are used to set up a sequential hypothesis test: a false positive rate, a false negative rate and a minimum signal level. The false positive and false negative rates are familiar concepts from basic statistics. The minimum signal level is an extra parameter needed for sequential analysis. Based on these parameters, decision thresholds are calculated.

The false positive rate for each type of communication is derived from marketing level requirements and will vary depending on the type of transaction. For example, a price change message will typically require greater confidence than self test messages. For interim internal stages it may be a matter of convenience. For example, each message in a multi-message update may be sent with an $\alpha$ of 1 in 200 but the set of messages may then be verified by a single self test message with an $\alpha$ of 1 in 80,000 to meet customer requirements.

In deriving $\alpha$ from system requirements, it may be prudent to use the conservative allowance that every price change message will fail the first time and therefore use 1 in the number of messages per year. This assumption is robust and allows the system to retry many times. Provided the average number of transmission attempts per message does not exceed two, the false positive rate will not exceed specification. This means communication attempts should have at least a 50% probability of success.

A customer-driven false negative rate is typically specified. Because of shadowing by pallets of goods or parked shopping carts, electronic display unit 10 may be out of communication for several hours. To compensate for this, after a communication attempt fails, base communication station 12 will wait several hours and try again. The false negative rate ($\beta$) for pooling applies to a single attempt only. Making $\beta$ too small will cause electronic display system to use more messages to determine that electronic display unit 10 is shadowed. Electronic display system will probably perform best if $\beta$ is less than the shadowing probability of the weaker electronic display units 10. In the preferred embodiment of the electronic display system in accordance with the present invention, a $\beta$ of 5% has been assumed.

The sum of $\beta$ and the shadowing rate, and downlink batch failures, must be less than 50% for all electronic display units 10 to preserve the false negative rate given the choice of $\alpha$ above. After an upper bound on long term shadowing rates has been established by field experiments, $\beta$ is chosen and the number of delayed retries needed to meet the marketing requirements for false broken electronic display units 10 reports can be calculated as follows.

The number of false broken electronic display units 10 reports allowed per customer level message is:

$$\beta_m = \frac{1}{30 \cdot 15{,}000}$$

where

SP=0.1—Shadow probability (assumed)

$\beta$=0.05—Hypothesis test false positive

DF=0.05—Uplink batches that fail due to a downlink batch failure (assumed)

BFP=1−(1—SP)·(1−$\beta$)·(1−DF)

BFP=0.188—Probability of uplink batch failure from all causes

Allowed long term recalls $$ALR = \text{ceil}\left(\frac{\log(\beta_m)}{\log(BFP)}\right)_{ALR=8} \text{ ceil rounds up to the next integer}$$

Based on the $\alpha$ and $\beta$ chosen above, the two important decision thresholds (A and B) are defined as follows. If the cumulative test statistic log of the probability ratio (LPR) exceeds the log of A, then the signal level is sufficient to conclude that an acknowledgment occurred. If the cumulative test statistic log of the probability ratio (LPR) is less than the log of B, then base communication station 12 will conclude that an uplink was not received. The formulas given for calculating A and B are shown below:

$$A(\alpha, \beta) = \frac{1-\beta}{\alpha}$$

$$B(\alpha, \beta) = \frac{\beta}{1-\alpha}$$

These equations calculate values of A and B that are sufficient to ensure that α and β are better than specified. This should mean that the electronic display system will exceed specifications and ensure customer satisfaction. It should be noted that because this assumes that a perfect uplink is achieved through downlink pooling and no shadowing, the actual communication attempt failure rate will exceed β. However, because of subsequent retransmissions, the customer will not see this.

The concept of a minimum level is important, since testing continues until one of the two hypotheses is proved. The test will not terminate if a minimum uplink level that exceeds the noise level is not established. If the minimum noise level is too high, weak electronic display units 10 will be unable to communicate. If it is too low, a large number of tries will be necessary before the electronic display system gives up on a particular electronic display unit 10 that may be shadowed. While setting this level 2 dB above the noise has been found to be acceptable, a more optimal value may be set based on particular field data. If shadowing occurs often, it may be desirable to establish a minimum uplink level on an electronic display unit 10 to electronic display unit 10 basis. It may be useful to take the greater of 2 dB or 33% of a well-established average signal strength for a particular electronic display unit 10. Before reporting that a particular electronic display unit 10 is broken, it is preferably for base communication system 12 to retry with the default minimum signal level. Independent of the choice of minimum signal level, the false positive acknowledgment rate will not exceed specifications.

Calculating the expected number of messages to complete communication is analytically difficult. It depends on the uplink signal to noise ratio, the distribution of both signal and noise, the downlink batch size and the downlink success rate. It is best estimated by constructing a Monte Carlo simulation with the desired inputs and running it for a minimum of 1000 batches.

An estimate of the number of messages required assuming a perfect downlink can be obtained quickly with the formula below, however the accuracy associated with it is unknown.

$$\frac{\log(A(\alpha, \beta))}{LPR(\text{tag\_signal\_strength})}$$

A similar estimate of the number of messages required to conclude that a particular electronic display unit 10 is not acknowledging is:

$$\frac{\log(B(\alpha, \beta)}{LPR(\mu_n)}$$

The best known way to choose downlink batch sizes is to estimate the number of messages by simulation as noted above for both batches and then to compute the following ratio:

$$E_{\text{small\_batch}} = \frac{\text{Expected\_messages\_with\_large\_batch}}{\text{Expected\_messages\_with\_small\_batch}}$$

If this ratio is greater than one, use the small batch. If it is less than one, use the large batch. If this ratio results in a shortage of capacity for one batch size, switch batches for those situations closest to one. The assignment of a large number of electronic display units 10 contrary to efficiency may indicate a need to change the sizes of small batch and large batch.

If simulation results are unavailable, the downlink batch size can be selected based on setting a minimum downlink batch success rate. A 90% or better batch success rate is likely to provide good performance unless a large number of batches are needed. The batch size can be selected by using the following equation to estimate batch success rate (BSR) for the small batch:

$$BSR = 1 - (1 - DSR)^{Small\_batch\_size}$$

If the batch success rate (BSR) for the small batch is too low, use the large batch.

When a new electronic display system is initially turned on, it will broadcast dummy messages and gather noise background data for several minutes. When a new electronic display unit 10 is introduced into an electronic display system operating environment, base communication station 12 will initially send a change electronic display unit 10 identification number or self test message using the large batch. For periods when many new electronic display units 10 are being introduced, a small batch size of 1 and a large batch size of 16 is recommended. During the uplink it will instruct base communication station 12 to switch between antennas so that each antenna receives an equal share of uplinks. It will perform hypothesis testing on base communication station 12 and each antenna until one of the signals demonstrates an acknowledgment with an α of 0.0001. At this point it will designate the specific antenna on base communication station 12 with the strongest signal, i.e., the greatest Σ log of the probability ratio (LPR), as the primary one and the next strongest signals as the secondary and tertiary ones for that particular electronic display unit 10. Base communication station 12 should then attempt to use small batch for sending additional information to the particular electronic display unit 10 such as price information. Based on the success of attempts using small batch, base communication station 12 can estimate the downlink success rate (DSR) and decide if switching back to large batch is appropriate. Base communication station 12 can then communicate normally with that particular electronic display unit 10. If no antennas can find the particular electronic display unit 10, it should schedule a retry retransmission several hours later. After a sufficient number of attempts to communicate that particular electronic display unit 10 should be reported as broken.

Based on the history of a particular electronic display unit's 10 performance at a given location, i.e., with a particular preferred antenna, base communication station 12 estimates the downlink success rate (DSR) of a particular electronic display unit 10 and chooses an appropriate batch size. Base communications station 12 then sends the message to the particular electronic display unit 10 and waits until:

1. It has received an uplink with a confidence level appropriate for the message class; or 2. It concludes that the particular electronic display unit 10 is not acknowledging.

If it concludes the particular electronic display unit 10 is not acknowledging, it should:

1. Check the secondary and tertiary antennas for an acknowledgment signal. In some cases, these will be on different base communication stations 12 and therefore will collect data simultaneously. When reusing the same data on an alternate antenna the value of $\alpha$ should be divided by 3.
2. Look at the sum of the log of the probability ratio (LPR) values from all successful messages since the particular electronic display unit's 10 identification number was last changed. If this sum is less than twelve, it should also attempt to send the particular electronic display unit's 10 identification number command.
3. Schedule a communication attempt for several hours later. After several attempts it should assume that the particular electronic display unit 10 has moved and follow the procedure described above for newly repositioned electronic display units 10. It may reuse any available data from other antennas.

If a memory checking self test fails, base communication station 12 should reestablish communication by using a self test without the memory test. Once communication is reestablished, the memory test should be tried again immediately. Then if it again fails, base communication station 12 should reload the particular electronic display unit's 10 memory.

Although the present invention has been described above in detail, such explanation is by way of example only, and is not to be taken as a limitation on the present invention. For example, electronic display systems in accordance with the present invention could be used in various environments other than retail stores, for example in warehouses and distribution centers. Accordingly, the scope and content of the present invention are to be limited and defined only by the terms of the appended claims.

What is claimed is:

1. A wireless electronic display system, comprising a transmitter at a base station and a plurality of receivers which do not include a radio frequency source, said transmitter transmitting a first level of transmissions including multiple identical first messages and a second level of transmissions including multiple identical second messages, said first level of transmissions having a first level of confidence of successful receipt associated therewith and said second level of transmissions having a second level of confidence of successful receipt associated therewith wherein said first level of confidence is greater than said second level of confidence and wherein said first level of confidence is predetermined for a first message class including the first message and said second level of confidence is predetermined for a second message class including the second message wherein the first message is different from the second message.

2. The wireless electronic display system in accordance with claim 1, wherein said wireless electronic display system utilizes modulated backscatter.

* * * * *